US012018234B2

(12) United States Patent
Peera et al.

(10) Patent No.: US 12,018,234 B2
(45) Date of Patent: *Jun. 25, 2024

(54) LIQUID LAUNDRY DETERGENT WITH CLEANING BOOSTER

(71) Applicants: Dow Global Technologies LLC, Midland, MI (US); Rohm and Haas Company, Collegeville, PA (US)

(72) Inventors: Asghar A. Peera, Royersford, PA (US); Stephen J. Donovan, Sellersville, PA (US); Roy Roberts, Bristol, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 422 days.

This patent is subject to a terminal disclaimer.

(21) Appl. No.: 17/604,499

(22) PCT Filed: May 28, 2020

(86) PCT No.: PCT/US2020/034805

§ 371 (c)(1),
(2) Date: Oct. 18, 2021

(87) PCT Pub. No.: WO2020/251766

PCT Pub. Date: Dec. 17, 2020

(65) Prior Publication Data

US 2022/0204890 A1 Jun. 30, 2022

Related U.S. Application Data

(60) Provisional application No. 62/861,475, filed on Jun. 14, 2019.

(51) Int. Cl.
*C11D 17/00* (2006.01)
*C11D 3/37* (2006.01)

(52) U.S. Cl.
CPC .......... *C11D 3/3707* (2013.01); *C11D 3/3765* (2013.01); *C11D 2111/12* (2024.01)

(58) Field of Classification Search
None
See application file for complete search history.

(56) References Cited

U.S. PATENT DOCUMENTS 8,450,261 B2 5/2013 Nakano et al.
9,771,547 B2 9/2017 Hulskotter et al.
2005/0245428 A1 11/2005 Rodrigues et al.
2009/0005288 A1 1/2009 Boutique et al.
2010/0275396 A1* 11/2010 Nakano ................. C08F 222/02 510/357
2011/0245132 A1* 10/2011 Dupont ................. C08F 216/14 510/357
2013/0171210 A1 7/2013 Baker et al.
2014/0371126 A1 12/2014 Rodrigues et al.
2015/0329479 A1 11/2015 Ma et al.
2016/0090552 A1 3/2016 Loughnane et al.
2016/0312152 A1 10/2016 Borne et al.
2017/0226371 A1* 8/2017 Deshpande .......... C09D 133/14
2017/0309916 A1* 10/2017 Toyoda ................. H01M 4/622
2019/0284463 A1* 9/2019 Mazard .................... C09K 8/32

FOREIGN PATENT DOCUMENTS

EP 3197995 8/2017
JP 10273351 10/1998
JP 2003306699 10/2003
WO 00/71652 11/2000
WO 2014009408 1/2014
WO 2014032269 3/2014
WO 2016045026 3/2016
WO 2016048969 3/2016
WO WO-2019092036 A1 * 5/2019

* cited by examiner

*Primary Examiner* — Lorna M Douyon
(74) *Attorney, Agent, or Firm* — Thomas S. Deibert

(57) ABSTRACT

A liquid laundry detergent formulation is provided, comprising: a liquid carrier; a cleaning surfactant; and a cleaning booster polymer, wherein the cleaning booster polymer has structural units of a monoethylenically unsaturated carboxylic acid monomer; structural units of an ethylenically unsaturated monomer of formula (I)

(I)

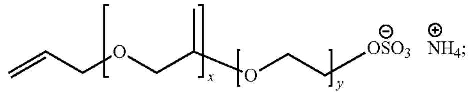

and, optionally, structural units of an ethylenically unsaturated monomer of formula (II)

(II)

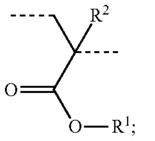

wherein x is an average of 0 to 20; wherein y is an average of 0 to 30; wherein x+y>1;

wherein $R^1$ is a $-C_{1-4}$ alkyl group; and wherein $R^2$ is selected from hydrogen and a methyl group.

9 Claims, No Drawings

LIQUID LAUNDRY DETERGENT WITH CLEANING BOOSTER

The present invention relates to a liquid laundry detergent formulation. In particular, the present invention relates to a liquid laundry detergent formulation, comprising a liquid carrier, a cleaning surfactant and a cleaning booster polymer having structural units of a monoethylenically unsaturated carboxylic acid monomer; structural units of an ethylenically unsaturated monomer of formula (I)

(I)

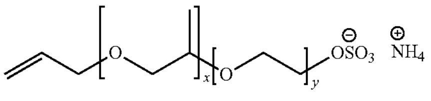

and, optionally, structural units of an ethylenically unsaturated monomer of formula (II)

(II)

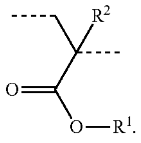

Laundry detergents in liquid and gel forms providing excellent overall cleaning are desirable to consumers. Such laundry detergents typically include surfactants among other components to deliver the consumer desired cleaning benefits. Nevertheless, increasing sensitivity for the environment and rising material costs, a move to reduce the utilization of surfactants in laundry detergents is growing. Consequently, detergent manufactures are seeking ways to reduce the amount of surfactant per unit dose of the laundry detergent while maintaining overall cleaning performance.

One approach for reducing the unit dose of surfactant is to incorporate polymers into the liquid detergent formulations as described by Boutique et al. in U.S. Patent Application Publication No. 20090005288. Boutique et al. disclose a graft copolymer of polyethylene, polypropylene or polybutylene oxide with vinyl acetate in a weight ratio of from about 1:0.2 to about 1:10 for use in liquid or gel laundry detergent formulations having about 2 to about 20 wt % surfactant.

Notwithstanding, there remains a continuing need for liquid laundry detergent formulations exhibiting maintained primary cleaning performance with a reduced surfactant loading; preferably, while also providing improved anti-redeposition performance.

The present invention provides a liquid laundry detergent formulation, comprising: a liquid carrier; a cleaning surfactant; and a cleaning booster polymer, wherein the cleaning booster polymer, comprising: (a) 50 to 95 wt %, based on dry weight of the cleaning booster polymer, of structural units of a monoethylenically unsaturated carboxylic acid monomer; (b) 5 to 50 wt %, based on dry weight of the cleaning booster polymer, of structural units of an ethylenically unsaturated monomer of formula (I)

(I)

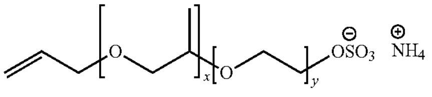

wherein x is an average of 0 to 20; wherein y is an average of 0 to 30 and wherein x+y≥1; and (c) 0 to 25 wt %, based on dry weight of the cleaning booster polymer, of structural units of an ethylenically unsaturated monomer of formula (II)

(II)

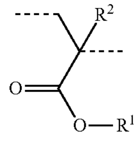

wherein each $R^1$ is independently selected from a $C_{1-4}$ alkyl group; and wherein each $R^2$ is independently selected from the group consisting of a hydrogen and a methyl group.

The present invention provides a method of washing a fabric article of the present invention, comprising: providing a soiled fabric article; providing a liquid laundry detergent formulation of the present invention; providing a wash water; and applying the wash water and the liquid laundry detergent formulation to the soiled fabric to provide a cleaned fabric article.

DETAILED DESCRIPTION

It has been surprisingly found that the liquid laundry detergent formulations with a cleaning booster polymer as described herein facilitate a improvement in primary cleaning for dust sebum, while maintaining good anti-redeposition performance for ground clay.

Unless otherwise indicated, ratios, percentages, parts, and the like are by weight. Weight percentages (or wt %) in the composition are percentages of dry weight, i.e., excluding any water that may be present in the composition.

As used herein, unless otherwise indicated, the terms "weight average molecular weight" and "$M_w$" are used interchangeably to refer to the weight average molecular weight as measured in a conventional manner with gel permeation chromatography (GPC) and conventional standards, such as polystyrene standards. GPC techniques are discussed in detail in Modern Size Exclusion Liquid Chromatography: Practice of Gel Permeation and Gel Filtration Chromatography, Second Edition, Striegel, et al., John Wiley & Sons, 2009. Weight average molecular weights are reported herein in units of Daltons.

The term "structural units" as used herein and in the appended claims refers to the remnant of the indicated monomer; thus a structural unit of (meth)acrylic acid is illustrated:

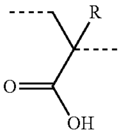

wherein the dotted lines represent the points of attachment to the polymer backbone and where R is a hydrogen for structural units of acrylic acid and a —$CH_3$ group for structural units of methacrylic acid.

Preferably, the liquid laundry detergent formulation of the present invention, comprises a liquid carrier (preferably, 25 to 97.9 wt % (more preferably, 50 to 94.5 wt %; still more preferably, 62.5 to 91.75 wt %; yet more preferably, 70 to 89.9 wt %; most preferably, 76 to 88 wt %), based on weight of the liquid laundry detergent formulation, of the liquid carrier); a cleaning surfactant (preferably, 2 to 60 wt % (more preferably, 5 to 40 wt %; still more preferably, 7.5 to 30 wt %; yet more preferably, 10 to 25 wt %; most preferably, 10 to 20 wt %), based on weight of the liquid laundry detergent formulation, of the cleaning surfactant); and a cleaning booster polymer (preferably, 0.1 to 15 wt % (more preferably, 0.5 to 10 wt %; still more preferably, 0.75 to 7.5 wt %; yet more preferably, 1 to 5 wt %; most preferably 2 to 4 wt %), based on weight of the liquid laundry detergent formulation, of the cleaning booster polymer), wherein the cleaning booster polymer comprises: (a) structural units of a monoethylenically unsaturated carboxylic acid monomer; (b) structural units of an ethylenically unsaturated monomer of formula (I)

(I)

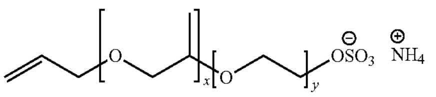

wherein x is an average of 0 to 20; wherein y is an average of 0 to 30 and wherein x+y>1; and, optionally, (c) structural units of an ethylenically unsaturated monomer of formula (II)

(II)

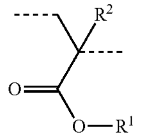

wherein each $R^1$ is independently selected from a —$C_{1-4}$ alkyl group; and wherein each $R^2$ is independently selected from the group consisting of a hydrogen and a methyl group.

Preferably, the liquid laundry detergent formulation of the present invention, comprises a liquid carrier. More preferably, the liquid laundry detergent formulation of the present invention comprises 25 to 97.9 wt % (preferably, 50 to 94.5 wt %; more preferably, 62.5 to 91.75 wt %; yet more preferably, 70 to 89.9 wt %; most preferably, 76 to 88 wt %), based on weight of the liquid laundry detergent formulation, of a liquid carrier. Still more preferably, the liquid laundry detergent formulation of the present invention comprises 25 to 97.9 wt % (preferably, 50 to 94.5 wt %; more preferably, 62.5 to 91.75 wt %; yet more preferably, 70 to 89.9 wt %; most preferably, 76 to 88 wt %), based on weight of the liquid laundry detergent formulation, of a liquid carrier; wherein the liquid carrier comprises water. Most preferably, the liquid laundry detergent formulation of the present invention comprises 25 to 97.9 wt % (preferably, 50 to 94.5 wt %; more preferably, 62.5 to 91.75 wt %; yet more preferably, 70 to 89.9 wt %; most preferably, 76 to 88 wt %), based on weight of the liquid laundry detergent formulation, of a liquid carrier; wherein the liquid carrier is water.

Preferably, the liquid carrier can include water miscible liquids, such as, $C_{1-3}$ alkanolamines and $C_{1-3}$ alkanols. More preferably, the liquid carrier includes 0 to 8 wt % (preferably, 0.2 to 8 wt %; more preferably, 0.5 to 5 wt %), based on weight of the liquid carrier, of water miscible liquids; wherein the water miscible liquids are selected from the group consisting of $C_{1-3}$ alkanolamines, $C_{1-3}$ alkanols and mixtures thereof.

Preferably, the liquid laundry detergent formulation of the present invention, comprises: a cleaning surfactant. More preferably, the liquid laundry detergent formulation of the present invention, comprises: 2 to 60 wt % (more preferably, 5 to 40 wt %; still more preferably, 7.5 to 30 wt %; yet more preferably, 10 to 25 wt %; most preferably, 10 to 20 wt %), based on weight of the liquid laundry detergent formulation, of a cleaning surfactant. Still more preferably, the liquid laundry detergent formulation of the present invention, comprises: 2 to 60 wt % (more preferably, 5 to 40 wt %; still more preferably, 7.5 to 30 wt %; yet more preferably, 10 to 25 wt %; most preferably, 10 to 20 wt %), based on weight of the liquid laundry detergent formulation, of a cleaning surfactant; wherein the cleaning surfactant is selected from the group consisting of anionic surfactants, nonionic surfactants, cationic surfactants, amphoteric surfactants and mixtures thereof. Yet still more preferably, the liquid laundry detergent formulation of the present invention, comprises: 2 to 60 wt % (more preferably, 5 to 40 wt %; still more preferably, 7.5 to 30 wt %; yet more preferably, 10 to 25 wt %; most preferably, 10 to 20 wt %), based on weight of the liquid laundry detergent formulation, of a cleaning surfactant; wherein the cleaning surfactant is selected from the group consisting of a mixture including an anionic surfactant and a non-ionic surfactant. Most preferably, the liquid laundry detergent formulation of the present invention, comprises: 2 to 60 wt % (more preferably, 5 to 40 wt %; still more preferably, 7.5 to 30 wt %; yet more preferably, 10 to 25 wt %; most preferably, 10 to 20 wt %), based on weight of the liquid laundry detergent formulation, of a cleaning surfactant; wherein the cleaning surfactant includes a mixture of a linear alkyl benzene sulfonate, a sodium lauryl ethoxysulfate and a nonionic alcohol ethoxylate.

Anionic surfactants include alkyl sulfates, alkyl benzene sulfates, alkyl benzene sulfonic acids, alkyl benzene sulfonates, alkyl polyethoxy sulfates, alkoxylated alcohols, paraffin sulfonic acids, paraffin sulfonates, olefin sulfonic acids, olefin sulfonates, alpha-sulfocarboxylates, esters of alpha-sulfocarboxylates, alkyl glyceryl ether sulfonic acids, alkyl glyceryl ether sulfonates, sulfates of fatty acids, sulfonates of fatty acids, sulfonates of fatty acid esters, alkyl phenols, alkyl phenol polyethoxy ether sulfates, 2-acryloxy-alkane-1-sulfonic acid, 2-acryloxy-alkane-1-sulfonate, beta-alkyloxy alkane sulfonic acid, beta-alkyloxy alkane sulfonate, amine oxides and mixtures thereof. Preferred anionic surfactants include $C_{8-20}$ alkyl benzene sulfates, $C_{8-20}$ alkyl benzene sulfonic acid, $C_{8-20}$ alkyl benzene sulfonate, paraffin sulfonic acid, paraffin sulfonate, alpha-olefin sulfonic acid, alpha-olefin sulfonate, alkoxylated alcohols, $C_{8-20}$ alkyl phenols, amine oxides, sulfonates of fatty acids, sulfonates of fatty acid esters, $C_{8-10}$ alkyl polyethoxy sulfates and mixtures thereof. More preferred anionic surfactants include $C_{12-16}$ alkyl benzene sulfonic acid, $C_{12-16}$ alkyl benzene sulfonate, $C_{12-16}$ paraffin-sulfonic acid, $C_{12-18}$ paraffin-sulfonate, $C_{12-16}$ alkyl polyethoxy sulfate and mixtures thereof.

Non-ionic surfactants include alkoxylates (e.g., polyglycol ethers, fatty alcohol polyglycol ethers, alkylphenol polyglycol ethers, end group capped polyglycol ethers, mixed ethers, hydroxy mixed ethers, fatty acid polyglycol esters and mixtures thereof. Preferred non-ionic surfactants include fatty alcohol polyglycol ethers. More preferred non-ionic surfactants include secondary alcohol ethoxylates, ethoxylated 2-ethylhexanol, ethoxylated seed oils, butanol caped ethoxylated 2-ethylhexanol and mixtures thereof. Most preferred non-ionic surfactants include secondary alcohol ethoxylates.

Cationic surfactants include quaternary surface active compounds. Preferred cationic surfactants include quaternary surface active compounds having at least one of an ammonium group, a sulfonium group, a phosphonium group, an iodonium group and an arsonium group. More preferred cationic surfactants include at least one of a dialkyldimethylammonium chloride and alkyl dimethyl benzyl ammonium chloride. Still more preferred cationic surfactants include at least one of $C_{16-18}$ dialkyldimethylammonium chloride, a $C_{8-18}$ alkyl dimethyl benzyl ammonium chloride and dimethyl ditallow ammonium chloride. Most preferred cationic surfactant includes dimethyl ditallow ammonium chloride.

Amphoteric surfactants include betaines, amine oxides, alkylamidoalkylamines, alkyl-substituted amine oxides, acylated amino acids, derivatives of aliphatic quaternary ammonium compounds and mixtures thereof. Preferred amphoteric surfactants include derivatives of aliphatic quaternary ammonium compounds. More preferred amphoteric surfactants include derivatives of aliphatic quaternary ammonium compounds with a long chain group having 8 to 18 carbon atoms. Still more preferred amphoteric surfactants include at least one of $C_{12-14}$ alkyldimethylamine oxide, 3-(N,N-dimethyl-N-hexadecyl-ammonio)propane-1-sulfonate, 3-(N,N-dimethyl-N-hexadecylammonio)-2-hydroxypropane-1-sulfonate. Most preferred amphoteric surfactants include at least one of $C_{12-14}$ alkyldimethylamine oxide.

Preferably, the liquid laundry detergent formulation of the present invention, comprises: a cleaning booster polymer. More preferably, the liquid laundry detergent formulation of the present invention, comprises: 0.1 to 15 wt % (preferably, 0.5 to 10 wt %; more preferably, 0.75 to 7.5 wt %; still more preferably, 1 to 5 wt %; most preferably 2 to 4 wt %), based on weight of the liquid laundry detergent formulation, of a cleaning booster polymer. Most preferably, the liquid laundry detergent formulation of the present invention, comprises: 0.1 to 15 wt % (preferably, 0.5 to 10 wt %; more preferably, 0.75 to 7.5 wt %; still more preferably, 1 to 5 wt %; most preferably 2 to 4 wt %), based on weight of the liquid laundry detergent formulation, of a cleaning booster polymer; wherein the cleaning booster polymer comprises: (a) 50 to 95 wt % (preferably, 55 to 85 wt %; more preferably, 60 to 82 wt %; most preferably, 62 to 70 wt %), based on dry weight of the cleaning booster polymer, of structural units of a monoethylenically unsaturated carboxylic acid monomer; (b) 5 to 50 wt % (preferably, 8 to 40 wt %; more preferably, 10 to 30 wt %; most preferably, 15 to 25 wt %), based on dry weight of the cleaning booster polymer, of structural units of an ethylenically unsaturated monomer of formula (I)

(I)

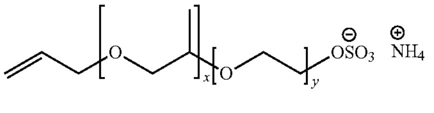

wherein x is an average of 0 to 20 (preferably, 0 to 15; more preferably, 0 to 10; most preferably, 2 to 6); wherein y is an average of 0 to 30 (preferably, 0 to 25; more preferably, 4 to 20; most preferably, 8 to 12) and wherein x+y≥1; and (c) 0 to 25 wt % (preferably, 0 to 20 wt %; more preferably, 5 to 15 wt %; most preferably, 8 to 13 wt %), based on dry weight of the cleaning booster polymer, of structural units of an ethylenically unsaturated monomer of formula (II)

(II)

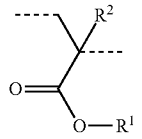

wherein each $R^1$ is independently selected from a $-C_{1-4}$ alkyl group; and wherein each $R^2$ is independently selected from the group consisting of a hydrogen and a methyl group.

Preferably, the cleaning booster polymer of the present invention has a weight average molecular weight, $M_w$, of 500 to 100,000 Daltons (preferably, 2,000 to 50,000 Daltons; more preferably, 2,500 to 20,000 Daltons; most preferably, 4,000 to 10,000 Daltons).

Preferably, the cleaning booster polymer used in the liquid laundry detergent formulation of the present invention comprises: 50 to 95 wt % (preferably, 55 to 85 wt %; more preferably, 60 to 82 wt %; most preferably, 62 to 70 wt %), based on dry weight of the cleaning booster polymer, of structural units of a monoethylenically unsaturated carboxylic acid monomer. More preferably, the cleaning booster polymer used in the liquid laundry detergent formulation of the present invention comprises: 50 to 95 wt % (preferably, 55 to 85 wt %; more preferably, 60 to 82 wt %; most preferably, 62 to 70 wt %), based on dry weight of the cleaning booster polymer, of structural units of a monoethylenically unsaturated carboxylic acid monomer; wherein the monoethylenically unsaturated carboxylic acid monomer is selected from monoethylenically unsaturated monomers that contain at least one carboxylic acid group. Still more preferably, the cleaning booster polymer used in the liquid laundry detergent formulation of the present invention comprises: 50 to 95 wt % (preferably, 55 to 85 wt %; more preferably, 60 to 82 wt %; most preferably, 62 to 70 wt %), based on dry weight of the cleaning booster polymer, of structural units of a monoethylenically unsaturated carboxylic acid monomer; wherein the monoethylenically unsaturated carboxylic acid monomer is selected from the group consisting of (meth)acrylic acid, (meth)acryloxypropionic acid, itaconic acid, aconitic acid, maleic acid, maleic anhydride, fumaric acid, crotonic acid, citraconic acid, maleic anhydride, monomethyl maleate, monomethyl fumarate, monomethyl itaconate, and other derivatives such as corresponding anhydride, amides, and esters. Yet still more preferably, the cleaning booster polymer used in the liquid laundry detergent formulation of the present invention comprises: 50 to 95 wt % (preferably, 55 to 85 wt %; more preferably, 60 to 82 wt %; most preferably, 62 to 70 wt %), based on dry weight of the cleaning booster polymer, of structural units of a monoethylenically unsaturated carboxylic acid monomer; wherein the monoethylenically unsaturated carboxylic acid monomer is selected from the group consisting of acrylic acid, methacrylic acid and mixtures thereof. Still yet more preferably, the cleaning booster polymer used in the liquid laundry detergent formulation of the present invention comprises: 50 to 95 wt % (preferably, 55 to 85 wt %; more preferably, 60 to 82 wt %; most preferably, 62 to 70 wt %), based on dry weight of the cleaning booster polymer, of structural units of a monoethylenically unsaturated carboxylic acid monomer; wherein the monoethylenically unsaturated carboxylic acid core monomer includes acrylic acid. Most preferably, the cleaning booster polymer used in the liquid laundry detergent formulation of the present invention comprises: 50 to 95 wt % (preferably, 55 to 85 wt %; more preferably, 60 to 82 wt %; most preferably, 62 to 70 wt %), based on dry weight of the cleaning booster polymer, of structural units of a monoethylenically unsaturated carboxylic acid monomer; wherein the monoethylenically unsaturated carboxylic acid core monomer is acrylic acid.

Preferably, the cleaning booster polymer used in the liquid laundry detergent formulation of the present invention comprises: 50 to 95 wt % (preferably, 55 to 85 wt %; more preferably, 60 to 82 wt %; most preferably, 62 to 70 wt %), based on dry weight of the cleaning booster polymer, of structural units of a monoethylenically unsaturated carboxylic acid monomer; wherein the structural units of the monoethylenically unsaturated carboxylic acid monomer are structural units of formula (III)

(III)

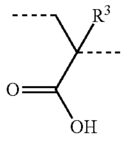

wherein each $R^3$ is independently selected from a hydrogen and a —$CH_3$ group (preferably, a hydrogen). Most preferably, the cleaning booster polymer used in the liquid laundry detergent formulation of the present invention, comprises: 50 to 95 wt % (preferably, 55 to 85 wt %; more preferably, 60 to 82 wt %; most preferably, 62 to 70 wt %), based on dry weight of the cleaning booster polymer, of structural unites of a monoethylenically unsaturated carboxylic acid monomer; wherein the structural units of the monoethylenically unsaturated monocarboxylic acid monomer are structural units of formula (III), wherein each $R^3$ is independently selected from a hydrogen and a —$CH_3$ group; wherein $R^3$ is a hydrogen in 50 to 100 mol % (preferably, 75 to 100 mol %; more preferably, 90 to 100 mol %; still more preferably, 98 to 100 mol %; most preferably, 100 mol %) of the structural units of formula (III) in the cleaning booster polymer.

Preferably, the cleaning booster polymer used in the liquid laundry detergent formulation of the present invention comprises: 5 to 50 wt % (preferably, 8 to 40 wt %; more preferably, 10 to 30 wt %; most preferably, 15 to 25 wt %), based on dry weight of the cleaning booster polymer, of structural units of an ethylenically unsaturated monomer of formula (I)

(I)

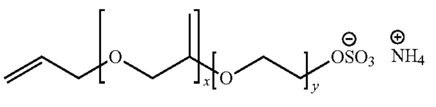

wherein x is an average of 0 to 20 (preferably, 0 to 15; more preferably, 0 to 10; most preferably, 2 to 6); wherein y is an average of 0 to 30 (preferably, 0 to 25; more preferably, 4 to 20; most preferably, 8 to 12) and wherein $x+y \geq 1$.

Preferably, the cleaning booster polymer used in the liquid laundry detergent formulation of the present invention comprises: 0 to 25 wt % (preferably, 0 to 20 wt %; more preferably, 5 to 15 wt %; most preferably, 8 to 13 wt %), based on dry weight of the cleaning booster polymer, of structural units of an ethylenically unsaturated monomer of formula (II)

(II)

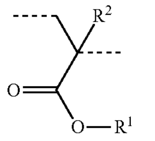

wherein each $R^1$ is independently selected from a —$C_{1-4}$ alkyl group (preferably, a methyl group, an ethyl group and a butyl group; more preferably, an ethyl group and a butyl group; most preferably, an ethyl group) and wherein each $R^2$ is independently selected from the group consisting of a hydrogen and a methyl group (preferably, a hydrogen). More preferably, the cleaning booster polymer used in the liquid laundry detergent formulation of the present invention comprises: 0 to 25 wt % (preferably, 0 to 20 wt %; more preferably, 5 to 15 wt %; most preferably, 8 to 13 wt %), based on dry weight of the cleaning booster polymer, of structural units of an ethylenically unsaturated monomer of formula (II), wherein $R^1$ is an ethyl group in 75 to 100 mol % (preferably, 90 to 100 mol %; more preferably, 98 to 100 mol %; most preferably, 100 mol %) of the structural units of formula (II) in the cleaning booster polymer and wherein $R^2$ is a hydrogen in 75 to 100 mol % (preferably, 90 to 100 mol %; more preferably, 98 to 100 mol %; most preferably, 100 mol %) of the structural units of formula (II) in the cleaning booster polymer.

Preferably, the cleaning booster polymer used in the liquid laundry detergent formulation of the present invention contains <1 wt % (preferably, <0.5 wt %; more preferably, <0.2 wt %; still more preferably, <0.1 wt %; yet still more preferably, <0.01 wt %; most preferably, <the detectable limit), based on the dry weight of the liquid laundry additive, of a vinyl alcohol polymer (PVA). More preferably, the cleaning booster polymer used in the liquid laundry detergent formulation of the present invention contains <1 wt % (preferably, <0.5 wt %; more preferably, <0.2 wt %; still more preferably, <0.1 wt %; yet still more preferably, <0.01 wt %; most preferably, <the detectable limit), based on the dry weight of the liquid laundry additive, of a vinyl alcohol polymer (PVA); wherein the vinyl alcohol polymer has a degree of saponification of 80 to 100 mol % (determined using the method specified in JIS K 6726 (1994)). Most preferably, the cleaning booster polymer used in the liquid laundry detergent formulation of the present invention contains <1 wt % (preferably, <0.5 wt %; more preferably, <0.2 wt %; still more preferably, <0.1 wt %; yet still more preferably, <0.01 wt %; most preferably, <the detectable limit), based on the dry weight of the liquid laundry additive, of a vinyl alcohol polymer (PVA); wherein the vinyl alcohol polymer may include modified vinyl alcohol polymer. Modified vinyl alcohol polymer includes anion-modified PVA (e.g., sulfonic acid group modified PVA and carboxylic acid group-modified PVA); cation-modified PVA (e.g., quaternary amine group-modified PVA); amide-modified PVA; acetoacetyl group-modified PVAs; diacetone acrylamide-modified PVA and ethylene-modified PVA.

Preferably, the liquid laundry detergent formulation of the present invention, optionally further comprises a structurant. More preferably, the liquid laundry detergent formulation of the present invention, further comprises 0 to 2 wt % (preferably, 0.05 to 0.8 wt %; more preferably, 0.1 to 0.4 wt %), based on weight of the liquid laundry detergent formulation, of a structurant. Most preferably, the liquid laundry detergent formulation of the present invention, further comprises 0 to 2 wt % (preferably, 0.05 to 0.8 wt %; more preferably, 0.1 to 0.4 wt %), based on weight of the liquid laundry detergent formulation, of a structurant; wherein the structurant is a non-polymeric, crystalline hydroxy-functional materials capable of forming thread like structuring systems throughout the liquid laundry detergent formulation when crystallized in situ.

Preferably, the liquid laundry detergent formulation of the present invention, optionally further comprises a hydrotrope. More preferably, the liquid laundry detergent formulation of the present invention, optionally further comprises: 0 to 10 wt % (preferably, 0.1 to 7.5 wt %; more preferably, 0.2 to 5 wt %; most preferably, 0.5 to 2.5 wt %), based on the weight of the liquid laundry detergent formulation, of a hydrotrope. More preferably, the liquid laundry detergent formulation of the present invention, optionally further comprises: 0 to 10 wt % (preferably, 0.1 to 7.5 wt %; more preferably, 0.2 to 5 wt %; most preferably, 0.5 to 2.5 wt %), based on the weight of the liquid laundry detergent formulation, of a hydrotrope; wherein the hydrotrope is selected from the group consisting of alkyl hydroxides; glycols; urea; monoethanolamine; diethanolamine; triethanolamine; calcium, sodium, potassium, ammonium and alkanol ammonium salts of xylene sulfonic acid, toluene sulfonic acid, ethylbenzene sulfonic acid, naphthalene sulfonic acid and cumene sulfonic acid; salts thereof and mixtures thereof. Most preferably, the liquid laundry detergent formulation of the present invention, further comprises: 0 to 10 wt % (preferably, 0.1 to 7.5 wt %; more preferably, 0.2 to 5 wt %; most preferably, 0.5 to 2.5 wt %), based on the weight of the liquid laundry detergent formulation, of a hydrotrope; wherein the hydrotrope is selected from the group consisting of ethanol, propylene glycol, sodium toluene sulfonate, potassium toluene sulfonate, sodium xylene sulfonate, ammonium xylene sulfonate, potassium xylene sulfonate, calcium xylene sulfonate, sodium cumene sulfonate, ammonium cumene sulfonate and mixtures thereof.

Preferably, the liquid laundry detergent formulation of the present invention, optionally further comprises a fragrance. More preferably, the liquid laundry detergent formulation of the present invention, optionally further comprises: 0 to 10 wt % (preferably, 0.001 to 5 wt %; more preferably, 0.005 to 3 wt %; most preferably, 0.01 to 2.5 wt %), based on the weight of the liquid laundry detergent formulation, of a fragrance.

Preferably, the liquid laundry detergent formulation of the present invention, optionally further comprises a builder. More preferably, the liquid laundry detergent formulation of the present invention, optionally further comprises: 0 to 50 wt % (preferably, 5 to 50 wt %; more preferably, 7.5 to 30 wt %), based on the weight of the liquid laundry detergent formulation, of a builder. Most preferably, the liquid laundry detergent formulation of the present invention, optionally further comprises: 0 to 50 wt % (preferably, 5 to 50 wt %; more preferably, 7.5 to 30 wt %), based on the weight of the liquid laundry detergent formulation, of a builder; wherein the builder; wherein the builder is selected from the group consisting of inorganic builders (e.g., tripolyphosphate, pyrophosphate); alkali metal carbonates; borates; bicarbonates; hydroxides; zeolites; citrates (e.g., sodium citrate); polycarboxylates; monocarboxylates; aminotrismethylenephosphonic acid; salts of aminotrismethylenephosphonic acid; hydroxyethanediphosphonic acid; salts of hydroxyethanediphosphonic acid; diethylenetriaminepenta(methylenephosphonic acid); salts of diethylenetriaminepenta(methylenephosphonic acid); ethylenediaminetetraethylenephosphonic acid; salts of ethylenediaminetetraethylenephosphonic acid; oligomeric phosphonates; polymeric phosphonates; mixtures thereof.

Preferably, the liquid laundry detergent formulation of the present invention, optionally further comprises a fabric softener. More preferably, the liquid laundry detergent formulation of the present invention, optionally further comprises: 0 to 10 wt % (preferably, 0.5 to 10 wt %), based on the weight of the liquid laundry detergent formulation, of a fabric softener. Most preferably, the liquid laundry detergent formulation of the present invention, optionally further comprises: 0 to 10 wt % (preferably, 0.5 to 10 wt %), based on the weight of the liquid laundry detergent formulation, of a fabric softener; wherein the fabric softener is a cationic coacervating polymer (e.g., cationic hydroxyl ethyl cellulose; polyquaternium polymers and combinations thereof).

Preferably, the liquid laundry detergent formulation of the present invention, optionally further comprises a pH adjusting agent. More preferably, the liquid laundry detergent formulation of the present invention, optionally further comprises a pH adjusting agent; wherein the liquid laundry detergent formulation has a pH from 6 to 12.5 (preferably, 6.5 to 11; more preferably, 7.5 to 10). Bases for adjusting pH include mineral bases such as sodium hydroxide (including soda ash) and potassium hydroxide; sodium bicarbonate; sodium silicate; ammonium hydroxide; and organic bases (e.g., mono-, di- or tri-ethanolamine; and 2-dimethylamino-2-methyl-1-propanol (DMAMP)). Acids to adjust the pH include mineral acids (e.g., hydrochloric acid, phosphorus acid and sulfuric acid) and organic acids (e.g., acetic acid).

Preferably, the liquid laundry detergent formulation of the present invention contains <1 wt % (preferably, <0.5 wt %; more preferably, <0.2 wt %; still more preferably, <0.1 wt %; yet still more preferably, <0.01 wt %; most preferably, <the detectable limit), based on the dry weight of the liquid laundry additive, of a vinyl alcohol polymer (PVA).

Preferably, the method of washing a fabric article of the present invention, comprises: providing a soiled fabric article (preferably, wherein the soiled fabric article is soiled with at least one of clay and dust sebum; more preferably, wherein the soiled fabric article is soiled with dust sebum) (preferably, wherein the soiled fabric article is a stained cotton; more preferably, wherein the soiled fabric article is cotton stained with used motor oil); providing a liquid laundry detergent formulation of the present invention; providing a wash water; and applying the wash water and the liquid laundry detergent formulation to the soiled fabric to provide a cleaned fabric article. More preferably, the method of washing a fabric article of the present invention, comprises: providing a soiled fabric article (preferably, wherein the soiled fabric article is soiled with at least one of clay and dust sebum; more preferably, wherein the soiled fabric article is soiled with dust sebum)(preferably, wherein the soiled fabric article is a stained cotton; more preferably, wherein the soiled fabric article is cotton stained with used motor oil); providing a liquid laundry detergent formulation of the present invention; providing a wash water; providing a rinse water; applying the wash water and the liquid laundry detergent formulation to the soiled fabric to provide a cleaned fabric article; and then applying the rinse water to the cleaned fabric article to remove the liquid laundry detergent formulation from the cleaned fabric article.

Some embodiments of the present invention will now be described in detail in the following Examples.

Synthesis S1: Polymer 1

A two liter round bottom flask, equipped with a mechanical stirrer, heating mantle, thermocouple, condenser and inlets for the addition of monomer(s), initiator and chain regulator was charged with deionized water (206.25 g). The flask contents were set to stir and heated to 72° C. Once the flask contents reached reaction temperature of 72° C., a 0.15% aqueous iron sulfate heptahydrate promoter solution (2.5 g) was added, followed by the addition of sodium metabisulfite (SMBS) (0.89 g) dissolved in deionized water (5.25 g) as a pre-charge. Then, separate feeds were made to the flask contents, as follows:

- Initiator co-feed: sodium persulfate (1.3 g) dissolved in deionized water (30 g) was fed to the flask over 95 minutes.
- Chain Transfer Agent (CTA) co-feed: sodium metabisulfite (20.86 g) dissolved in deionized water (60 g) was fed to the flask over 80 minutes.
- Monomer co-feed: A monomer solution containing glacial acrylic acid (240 g) and an ethylenically unsaturated monomer of formula (I), wherein x is 4 and y is 10 (available from Clariant as Emulsogen® APS-100)(60 g) was fed to the flask over 90 minutes.

Upon completion of the co-feeds, deionized water (15 g) was added as rinse. The flask contents were then held for at 72° C. for 10 minutes. At the completion of the hold, two sequential chase solutions were added to the flask with a 5 minute hold between the chase additions. Both chases comprised sodium persulfate (0.39 g) and deionized water (8 g) and were added over 10 minutes. After the second chase addition, the flask contents were then held at 72° C. for 20 minutes. At the completion of the final hold the flask contents were cooled to below 50° C. Then a 50% aqueous sodium hydroxide solution (100 g) was added to the flask slowly through an addition funnel while maintaining the temperature below 60° C. After addition of the aqueous sodium hydroxide solution, a 35% aqueous hydrogen peroxide scavenger solution (4 g) was added to the flask contents. With no residual bisulfite detected, a 50% aqueous sodium hydroxide solution (88 g) was added to the flask contents, keeping the temperature below 70° C. A final rinse of deionized water (15 g) was added through the addition funnel to the flask contents. The flask contents were then cooled to <35° C. The product polymer had a solids content of 45.0%, pH was 6.02, Brookfield viscosity of 2,340 cps. Residual monomer measured at below 50 ppm. Final weight average molecular weight, $M_w$, as measured by Gel Permeation Chromatography was 8,363 Daltons.

Synthesis S2: Polymer 2

A two liter round bottom flask, equipped with a mechanical stirrer, heating mantle, thermocouple, condenser and inlets for the addition of monomer(s), initiator and chain regulator was charged with deionized water (210 g). The flask contents were set to stir and heated to 72° C. Once the flask contents reached reaction temperature of 72° C., a 0.15% aqueous iron sulfate heptahydrate promoter solution (5.12 g) was added, followed by the addition of sodium metabisulfite (SMBS) (1.02 g) dissolved in deionized water (5.0 g) as a pre-charge. Then, separate feeds were made to the flask contents, as follows:

- Initiator co-feed: sodium persulfate (1.92 g) dissolved in deionized water (25 g) was fed to the flask over 115 minutes.
- Chain Transfer Agent (CTA) co-feed: sodium metabisulfite (23.14 g) dissolved in deionized water (45 g) was fed to the flask over 100 minutes.
- Monomer co-feed: A monomer solution containing glacial acrylic acid (196.2 g), ethyl acrylate (EA) (33.6 g) and an ethylenically unsaturated monomer of formula (I), wherein x is 4 and y is 10 (available from Clariant as Emulsogen® APS-100)(70.2 g) was fed to the flask over 110 minutes.

Upon completion of the co-feeds, deionized water (15 g) was added as rinse. The flask contents were then held for at 72° C. for 10 minutes. At the completion of the hold, two sequential chase solutions were added to the flask with a 5 minute hold between the chase additions. Both chases comprised sodium persulfate (1.1 g) and deionized water (20 g) and were added over 10 minutes. After the second chase addition, the flask contents were then held at 72° C. for 20 minutes. At the completion of the final hold a 35% aqueous hydrogen peroxide scavenger solution (3.3 g) was added to the flask contents. Then a final rinse of deionized water (179 g) was added through the addition funnel to the flask contents. The flask contents were then cooled to <35° C. The product polymer had a solids content of 37.8%, pH was 2.51, Brookfield viscosity of 80 cps. Residual monomer measured at below 55 ppm. Final weight average molecular weight, $M_w$, as measured by Gel Permeation Chromatography was 5,880 Daltons.

Comparative Examples C1-C2 and Examples 1-2: Liquid Laundry Detergent

The liquid laundry detergent formulations used in the cleaning tests in the subsequent Examples were prepared having the generic formulation as described in TABLE 1 with the cleaning booster polymer as noted in TABLE 2 and were prepared by standard liquid laundry formulation preparation procedures.

TABLE 1

| Ingredient | Commercial Name | wt % |
|---|---|---|
| Linear alkyl benzene sulfonate | Nacconal 90G* | 8.0 |
| Sodium lauryl ethoxysulfate | Steol CS-460* | 2.0 |
| Non-ionic surfactant | Biosoft N25-7* | 4.0 |
| Cleaning Booster polymer | — | 3.0 |
| Deionized water | — | QS to 100 |

*available from Stepan Company

TABLE 2

| Example | Cleaning Booster Polymer |
|---|---|
| Comp. Ex. C1 | no cleaning booster polymer |
| Comparative Example C2 | ethoxylated poly(ethyleneimine)[2] |
| Ex. 1 | Synthesis S1: Polymer 1 |
| Ex. 2 | Synthesis S2: Polymer 2 |

[1]available from BASF under the tradename Sokolan™ HP-20

Primary Cleaning Performance

The primary cleaning performance of the liquid laundry detergent formulations of Comparative Examples C1-C2 and Examples 1-2 were assessed in a Terg-o-tometer Model TOM-52-A available from SR Lab Instruments (6×1 L wells) agitated at 90 cycles per minute with the conditions noted in TABLE 3.

TABLE 3

| Parameter | Setting |
|---|---|
| Temperature | 15° C. |
| Water hardness | 200 ppm, Ca/Mg = 2/1 |
| Fabric Types (3 in each well) | Stained Cotton 400 |
| Stains | Clay, Motor Oil and Dust Sebum (Bought from Scientific Services S/D, Inc.) |
| Wash time | 16 minutes |
| Rinse time | 3 minutes |
| Liquid laundry detergent dosage | 0.5 g/L |

The soil removal index (SRI) was calculated using ASTM Method D4265-14. The ΔSRI was determined in reference to a control detergent with the same surfactant concentrations absent cleaning booster. The results are provided in TABLE 4.

TABLE 4

| | Stain ΔSRI | | |
|---|---|---|---|
| Example | Ground Clay | Motor Oil | Dust Sebum |
| Comp. Ex. C2 | +8 | +5 | +1 |
| Ex. 1 | +6 | +4 | +2 |
| Ex. 2 | +7 | +1 | +3 |

Anti-Redeposition

The anti-redeposition performance of the Liquid laundry detergent formulations of Comparative Examples C1-C2 and Example 1 were assessed in a Terg-o-tometer Model 7243ES agitated at 90 cycles per minute with the conditions noted in TABLE 5.

TABLE 5

| Parameter | Setting |
|---|---|
| Temperature | 25° C. |
| Water hardness | 300 ppm, Ca/Mg = 2/1 |
| Fabric Types | Cotton Terry (CT)<br>Cotton (C)<br>Polyester: cotton blend (PB)<br>Cotton interlock (CI) |
| Wash time | 60 minutes |
| Rinse time | 3 minutes |
| Liquid laundry detergent dosage | 0.5 g/L |
| Anti-redeposition soils | 0.625 g/L Big Oak Clay (sourced locally from southeastern Pennsylvania)<br>2.5 g/L Body Sebum Emulsion (Scientific Services S/D Inc.) |

The fabrics were laundered for 5 consecutive cycles and the whiteness index was measured at 460 nm using a HunderLab UltraScan VIS Colorimeter to determine fabric whiteness in accordance with ASTM E313. The whiteness index for the neat unwashed fabrics was used as the positive control. The change in the whiteness index relative to the positive control for each of the liquid laundry formulations are provided in TABLE 6.

TABLE 6

| | Delta in Whiteness Index | | | |
|---|---|---|---|---|
| Example | CT | C | PB | CI |
| Comp. Ex. C1 | −74.53 | −26.60 | −43.84 | −24.77 |
| Comp. Ex. C2 | −56.11 | −17.61 | −35.18 | −14.95 |
| Ex. 1 | −60.74 | −11.71 | −29.68 | −8.56 |

We claim:

1. A liquid laundry detergent formulation, comprising:
   a liquid carrier;
   a cleaning surfactant; and
   a cleaning booster polymer, wherein the cleaning booster polymer, comprises:
   (a) 60 to 82 wt %, based on dry weight of the cleaning booster polymer, of structural units of a monoethylenically unsaturated carboxylic acid monomer; wherein the monoethylenically unsaturated carboxylic acid monomer is selected from the group consisting of acrylic acid, methacrylic acid and mixtures thereof;
   (b) 10 to 30 wt %, based on dry weight of the cleaning booster polymer, of structural units of an ethylenically unsaturated monomer of formula (I)

(I)

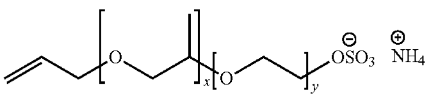

wherein x is an average of 0 to 20; wherein y is an average of 0 to 30 and wherein x+y≥1; and
   (c) 0 to 25 wt %, based on dry weight of the cleaning booster polymer, of structural units of an ethylenically unsaturated monomer of formula (II)

(II)

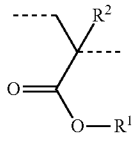

wherein each $R^1$ is independently selected from a $—C_{1-4}$ alkyl group; and wherein each $R^2$ is independently selected from the group consisting of a hydrogen and a methyl group.

2. The liquid laundry detergent formulation of claim 1, wherein the liquid laundry detergent formulation comprises
   25 to 97.9 wt %, based on weight of the liquid laundry detergent formulation, of the liquid carrier;
   2 to 60 wt %, based on weight of the liquid laundry detergent formulation, of the cleaning surfactant; and
   0.1 to 15 wt %, based on weight of the liquid laundry detergent formulation, of the cleaning booster polymer.

3. The liquid laundry detergent formulation of claim 1, wherein the liquid carrier comprises water.

4. The liquid laundry detergent formulation of claim 3, wherein the cleaning booster polymer has a weight average molecular weight, $M_W$, of 500 to 100,000 Daltons.

5. The liquid laundry detergent formulation of claim 4, wherein the structural units of monoethylenically unsaturated carboxylic acid monomer are structural units of formula (III)

(III)

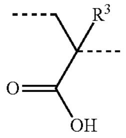

wherein each $R^3$ is independently selected from a hydrogen and a $-CH_3$ group; wherein each $R^3$ is a hydrogen in 50 to 100 mol % of the structural units of formula (III) in the cleaning booster polymer.

6. The liquid laundry detergent formulation of claim 5, wherein x is 2 to 6.

7. The liquid laundry detergent formulation of claim 6, wherein y is 8 to 12.

8. The liquid laundry detergent formulation of claim 7, further comprising at least one of a structurant, a hydrotrope, a fragrance, a builder and a fabric softener.

9. A method of washing a fabric article comprising: providing a soiled fabric article; providing a liquid laundry detergent formulation according to claim 1; providing a wash water; and applying the wash water and the liquid laundry detergent formulation to the soiled fabric to provide a cleaned fabric article.

* * * * *